3,141,101
BRUSHLESS SYNCHRO CONSTRUCTION
Morris F. Ketay, Great Neck, N.Y., assignor to United
Aircraft Corporation, East Hartford, Conn., a corporation of Delaware
Filed Dec. 2, 1960, Ser. No. 73,356
2 Claims. (Cl. 310—68)

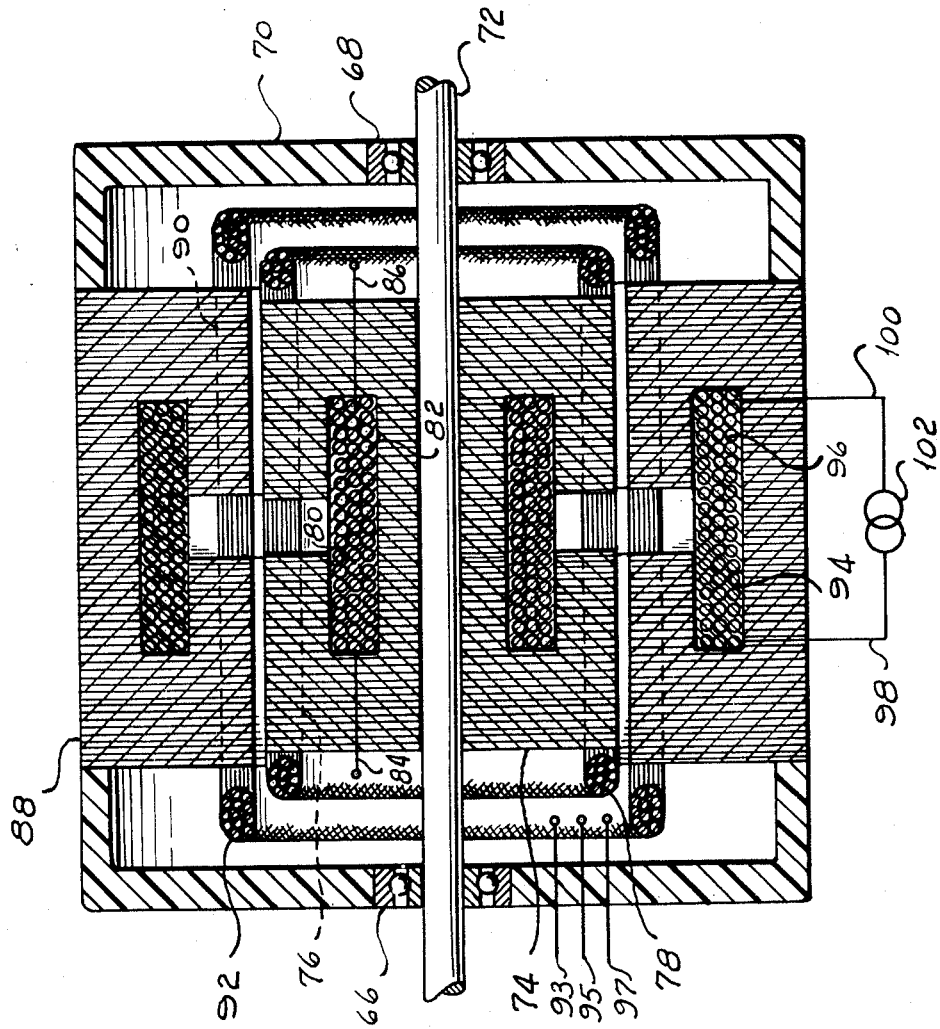

My invention relates to a synchronous device and more particularly to an improved synchronous device which is more accurate and more rugged than are synchronous devices of the prior art.

As is known in the art, a synchronous device or "synchro" is a very carefully constructed electric motor capable of producing an electrical signal representing the position of the shaft with reference to an arbitrary zero position and capable of assuming a particular shaft position when supplied with a signal from another synchro. The rotor of a synchro is a single phase coil wound on a laminated stack mounted on a shaft. The shaft if mounted on bearings which permit the rotor to rotate freely inside a stator carrying a three-phase winding. In the prior art the ends of the rotor coil are connected to collector rings which make contact with brushes attached to external leads by means of which either an electrical signal is supplied to the rotor or by means of which an electrical signal is coupled from the rotor to the external circuit.

Synchronous devices of the type described above are used in a great number of widely varying installations. With the advent of the age of pilotless aircraft and missiles, synchros are coming into increasingly wide use in control systems for such devices. In control systems of this type it is essential that the synchro operate as accurately as is possible. Consistent with this requirement, extraneous signals resulting from noise and the like should be held to a minimum. Further, in order that the devices be as sensitive as is possible, the frictional resistance to rotation of the rotor should be kept to a minimum. It is further desirable that the synchro should require substantially no maintenance even after a long period of time in use. Its construction should be such that it can withstand the shocks incident to high accelerations without derangement of its elements.

Synchronous devices of the prior art employing relatively movable brushes and slip rings which must make mechanical contact in order to transfer electrical energy have characteristics which are inconsistent with the desiderata outlined above. Owing to the fact that the mechanical contact between the brushes and the slip rings is not smooth and unvarying as the rotor moves relative to the stator extraneous signals or "noise" are generated.

Further, in causing relative movement between the stator and the rotor, not only must the friction necessarily inherent in the shaft mounting be overcome but also the friction between the brushes and the slip rings must be overcome. When the assembly is subject to sudden shocks and the like the possibility exists that the brushes may be displaced resulting either in misoperation or in poor operation of the synchro. As is the case with all devices which employ brushes and slip rings for transferring electrical energy after a period of time in use, the brushes become worn and must be replaced if the device is to operate in the most desirable manner.

I have invented an improved synchro construction which overcomes the defects of synchronous devices of the prior art pointed out hereinabove. In my construction I minimize the generation of extraneous signals with the result that the device is more accurate than are devices of the prior art. The only friction which need be overcome in moving the rotor of my device with respect of the stator is that of the rotor bearings so that my synchronous device is more sensitive than are devices of the prior art. My synchronous device is more rugged and requires substantially less maintenance than do synchronous devices of the prior art.

One object of my invention is to prevent an improved synchronous construction in which the generation of noise is minimized.

Another object of my invention is to provide an improved synchronous construction in which there is very little resistance to relative movement between the rotor and the stator.

A further object of my invention is to provide an improved synchronous device which is more rugged than are devices of the prior art.

Yet another object of my invention is to provide an improved synchronous construction which requires less maintenance than do devices of the prior art.

Other and further objects of my invention will appear from the following description.

In general my invention contemplates the provision of an improved synchro construction comprising a stator which carries the three-phase synchro stator winding as well as the primary winding of a radial transformer. I mount the single phase synchro rotor winding and the secondary winding of the radial transformer on the synchro shaft respectively in inductive relationship with the synchro stator winding and with the transformer primary winding. I connect the ends of the synchro roto winding to the transformer secondary winding and connect leads to the transformer primary winding to permit the radial transformer to couple electrical energy between the external circuit and the rotor synchro winding.

In the accompanying drawing which forms part of the instant specification and which is to be read in conjunction therewith, the figure is a sectional view of my improved synchro construction.

Referring now to the figure in my improved synchronous construction, respective bearings 66 and 68 carried by a housing 70 rotatably support a rotor shaft 72. A stack of rotor laminations 74 has slots 76 which receive the single phase rotor winding 78. I provide the stack of laminations 74 with an internal annular recess 80 which receives the secondary winding 82 of a radial transformer. Respective conductors 84 and 86 connect the ends of the secondary winding 82 to the ends of the synchro rotor winding 78.

Housing 70 carries a stack of stator laminations 88 provided with grooves 90 which receive the three-phase stator winding 92, having leads 93, 95 and 97. I form laminations 88 to provide an annular recess 94 which receives the primary winding 96 of the radial transformer. Respective conductors 98 and 100 permit electrical connections to be made from the external circuit to the primary winding 96. For example, where the device is to be used as a synchronous transmitter, I may connect a source 102 of single phase voltage to the conductors 98 and 100.

In operation of my invention, when the primary winding 96 is energized, for example, from a source 102 of electrical energy, a signal is induced in the secondary winding 82. Conductors 84 and 86 apply this signal to the rotor winding 78 to cause stator conductors 93, 95, and 97 to carry output signals which, when applied to the stator of a synchronous receiver result in the production of a magnetic field representing the angular position of shaft 72.

It will be seen that I have accomplished the objects of my invention. I have provided an improved syncho construction in which the generation of noise is held to a minimum. The only friction which need be overcome in moving the rotor of my device relative to the stator is that of the rotor shaft bearings. My construction is rugged and it requires no mechanical contact in order that electrical energy be transferred from the external circuit to the rotor. My device requires much less maintenance than is required in devices of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A synchronous device including in combination a stator, a shaft, means mounting said shaft for rotary movement on said stator, means forming an annular winding-receiving slot in said stator, said slot extending around said shaft at a location along the length of said shaft, means forming stator winding-receiving slots in said stator, said stator winding-receiving slots being disposed generally at said location along the shaft length in radially spaced relation to said annular slot, a primary winding disposed in said annular slot, said primary winding having an axis extending substantially parallel to said shaft axis, a stator winding disposed in said stator winding slots, said stator winding comprising a coil having an axis substantially perpendicular to said shaft axis, a secondary winding having an axis extending substantially parallel to said shaft axis, a rotor winding, said rotor winding comprising a coil having an axis extending substantially perpendicular to the axis of said shaft, means mounting said secondary and rotor windings on said shaft in inductive relationship respectively with said primary winding and with said stator winding and means connecting said secondary winding to said rotor winding.

2. A synchronous device including in combination a stator, a shaft, means mounting said shaft on said stator for rotary movement, a stator winding comprising a coil having an axis substantially perpendicular to the shaft axis, a primary winding having an axis extending substantially parallel to said shaft axis, means mounting said stator winding and said primary winding in radially spaced relationship at the same general location on said stator, a rotor winding comprising a coil having an axis extending substantially perpendicular to the axis of said shaft, a secondary winding having an axis extending in the direction of said shaft axis and means mounting said rotor winding and said secondary winding on said rotor in inductive relationship respectively with said stator winding and said primary winding.

References Cited in the file of this patent
UNITED STATES PATENTS

| | | |
|---|---|---|
| 2,432,982 | Braddon et al. | Dec. 23, 1947 |
| 2,611,891 | Bell | Sept. 23, 1952 |
| 2,809,310 | Dunn et al. | Oct. 8, 1957 |